United States Patent [19]

Karlichek et al.

[11] Patent Number: 4,591,128

[45] Date of Patent: May 27, 1986

[54] TOOL REACTION BALANCING MECHANISM

[76] Inventors: Gregory J. Karlichek, 269 Scott Lake Rd., Pontiac, Mich. 48055; Ronald J. Secord, 45824 Wakefield, Utica, Mich. 48087

[21] Appl. No.: 637,157

[22] Filed: Aug. 2, 1984

[51] Int. Cl.⁴ ............................................. F16M 3/00
[52] U.S. Cl. .................................. 248/652; 104/106; 173/43; 248/648; 248/657
[58] Field of Search ............... 248/652, 648, 657, 651, 248/653, 654; 173/43; 414/718, 591, 749; 901/48, 42, 41, 19, 15, 1; 104/106, 107

[56] References Cited

U.S. PATENT DOCUMENTS

| | | | |
|---|---|---|---|
| 3,828,862 | 8/1974 | Dabell et al. | 248/651 |
| 3,958,621 | 5/1976 | Hatch | 414/749 |
| 3,982,715 | 9/1976 | Lindren et al. | 248/654 |
| 4,260,319 | 4/1981 | Motoda et al. | 414/591 |
| 4,300,198 | 11/1981 | Davini | 901/48 |
| 4,500,065 | 2/1985 | Hennekes et al. | 901/41 |

*Primary Examiner*—Ramon S. Britts
*Assistant Examiner*—Ramon O. Ramirez

*Attorney, Agent, or Firm*—Gerald E. McGlynn, Jr.

[57] ABSTRACT

A tool reaction balancing mechanism consisting of a fluid-pressure reaction and balancing system and an articulated arm wherein the arm is suspended from dual overhead rails by a travelling bridge. The novel articulated arm has two pivotally connected arm sections. One of the arm sections is pivotally mounted at an end of the arm, to a portion of the bridge and the other arm section has means for holding a tool at an opposing end of the arm such that the articulated arm permits a tool fastened in the means for holding a tool to be displaced along a linear path. Biasing means urge the articulated arm toward a rest position wherein the arm sections of the articulated arm are folded in on each other. The novel travelling bridge consists of a main frame unit and a slideable frame unit telescopically connected by a cross beam such that a single trolley which is mounted at the top of the slideable frame unit, and which is engageable with and moveable along a first rail, is able to move in relation to a pair of trolleys which are mounted at the top of the main frame unit, and which are engageable with and moveable along a second rail.

41 Claims, 10 Drawing Figures

TOOL REACTION BALANCING MECHANISM

BACKGROUND OF THE INVENTION

It is now common to provide workers with tool reaction balancing mechanisms for holding tools which generate a high degree of torque or vibration and which may also have large mass and weight, such as nut-runners and certain types of welding equipment, for example. Known tool reaction balancing mechanisms typically consist of an arm having a hinge at the middle thereof, tool holding means at an end of the arm, and a pressurized-fluid, reaction and balancing system operatively connected to the tool holding means.

More particularly, the arm of a known tool reaction balancing mechanism generally has a first arm section and a second arm section. The first arm section is pivotally mounted at one end to a support member such as to swing arcuately therefrom along a first plane, and is hingedly connected at its other end to one end of the second arm section. The hinged connection between the arm section is adapted to permit the second arm section to move arcuately in relation to the first section along a second plane substantially at right angle to the plane of first arm section movement. The other end of the second arm section has the means for holding a tool.

A principal disadvantage to tool reaction balancing mechanism of the type described is that a tool mounted in the holding means at the free end of the second section of the mechanism arm is not displaceable linearly along either of the two planes at right angle. Yet, especially for assembly line operations, a tool is preferably able to be displaced along a linear path parallel to a linearly moving work station.

If desired, the support member to which the arm of a tool reaction balancing mechanism is pivotally mounted can be stationary and fixed, such as a post. However, in factory applications the arm of the mechanism is frequently suspended from overhead tracks or rails by a travelling bridge.

Prior art travelling bridges generally consist of a rigid cross beam, a depending load support beam, a pair of side beams and at least two trolley members fastened to each side beam. The side beams are fixedly secured to ends of the cross beam at right angle, in an H-shaped frame configuration, with the load support beam protruding downwardly from the cross beam proximate the middle thereof. The trolley members are each adapted to be rollably engageable with a track or rail.

These bridge structures, having trolley members fastened to the side beams of rigid H-shaped frames, are expensive to manufacture and are not satisfactory to use when the spaced-apart rails on which the trolley members ride are not perfectly parallel, since variances in the distance separating the rails along their respective lengths frequently can cause the bridge to become stuck. Prior attempts to solve this problem, by deliberating introducing play into the trolley members, for example, have produced unacceptable side effects, such as bridges which swing from overhead rails to an unsafe degree.

SUMMARY OF THE INVENTION

The principal object of the present invention is to provide an improved tool reaction balancing mechanism and travelling bridge asssembly. It will be understood, however, that the example of an improved tool reaction balancing mechanism hereinafter illustrated may be used separately from the improved travelling bridge, and vice versa.

The invention accomplishes its objects by providing an articulated arm for a tool reaction balancing mechanism which has means for pivotally mounting the arm to a support member at one end, which has means for holding an object at the other end, and which is configured to permit an object held in the holding means of the arm to be displaced along a linear path. More particularly, the arm is formed of two pivotally connected arm sections having adjustable biasing means urging the arm sections to fold in on each other.

The invention further accomplishes its objects by providing a travelling bridge having a three-point, trolley-member connectable with dual, spaced-apart overhead rails, instead of the usual four-point connectability, thereby reducing the cost of manufacture. The novel travelling bridge consists of a main frame unit having two trolleys fastened thereto and a slideable frame unit having a single trolley fastened thereto. The two trolley members of the main frame unit are engageable with and moveable along the first of the overhead rails, and the single trolley member of the slideable frame unit is engageable with and moveable along the second of the overhead rails. In addition, the slideable frame unit is telescopically connected to the main frame unit by a telescopic cross beam so that the trolley members are able to move in relation to each other to compensate for variances in the distance separating the rails along their respective lengths.

The principles and operation of the present invention will be further understood by those skilled in the art by reference to the accompanying drawings wherein like numerals designate like or equivalent parts and in which:

BRIEF DESCRIPTION OF THE DRAWINGS

FIGS. 4–9 are cross-sectional views along line 4—4 of FIG. 1 and lines 5—5, 6—6, 7—7, 8—8 and 9—9 of FIG. 2, respectively; and FIG. 10 is a schematic useful in illustrating the advantage of the invention.

DETAILED DESCRIPTION OF THE PREFERRED EMBODIMENTS

Figure 1:
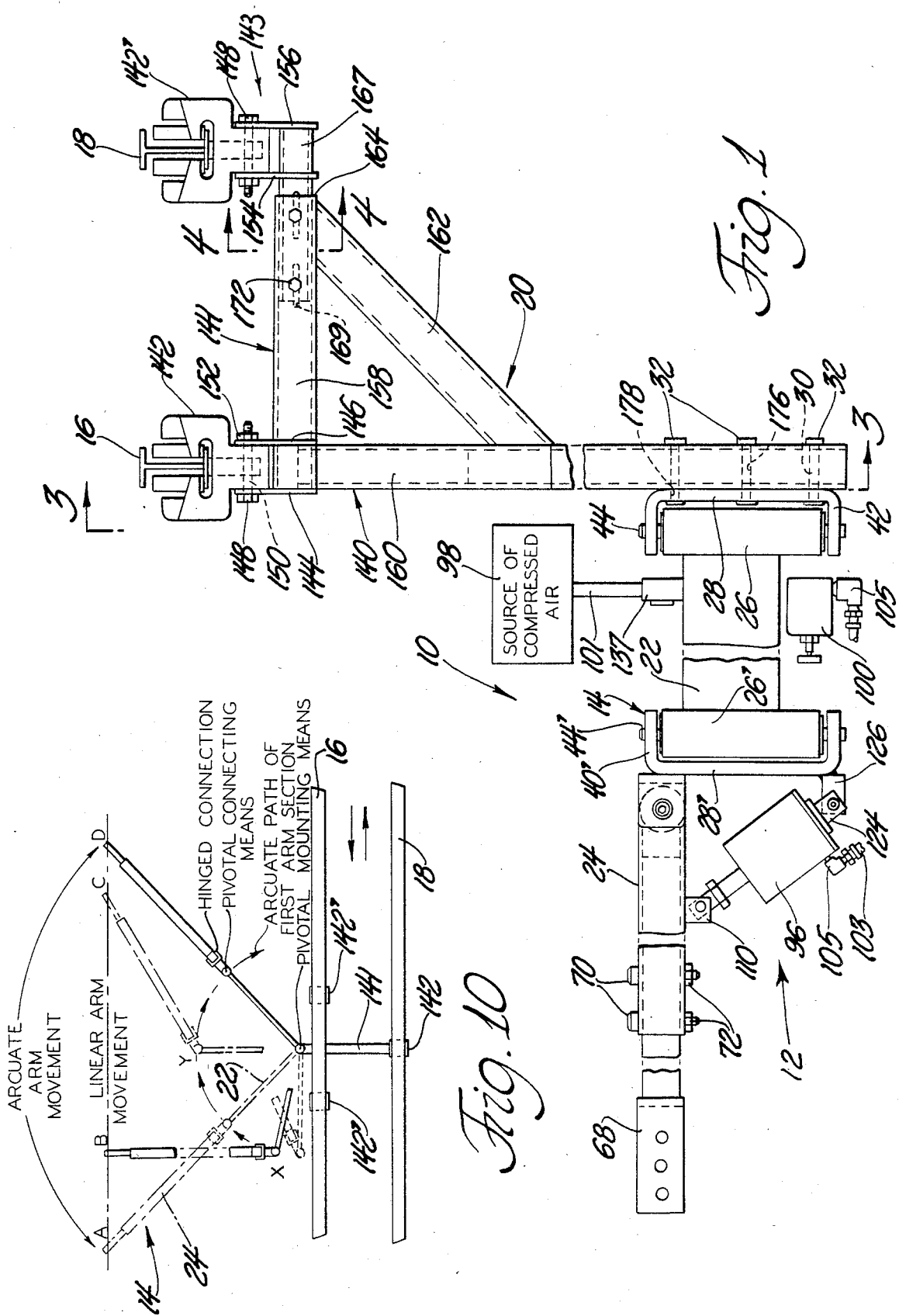
FIG. 1 is a a partially-schematic, side elevation view of an example of a tool reaction balancing mechanism and travelling bridge assembly according to the invention.

At FIG. 1 a tool reaction balancing mechanism 10, consisting of a fluid-pressure reaction and balancing system 12 and an articulated arm 14, is shown with the arm 14 of the mechanism 10 suspended from a pair of spaced-apart overhead tracks or rails 16, 18 by a travelling bridge 20.

Figure 2:
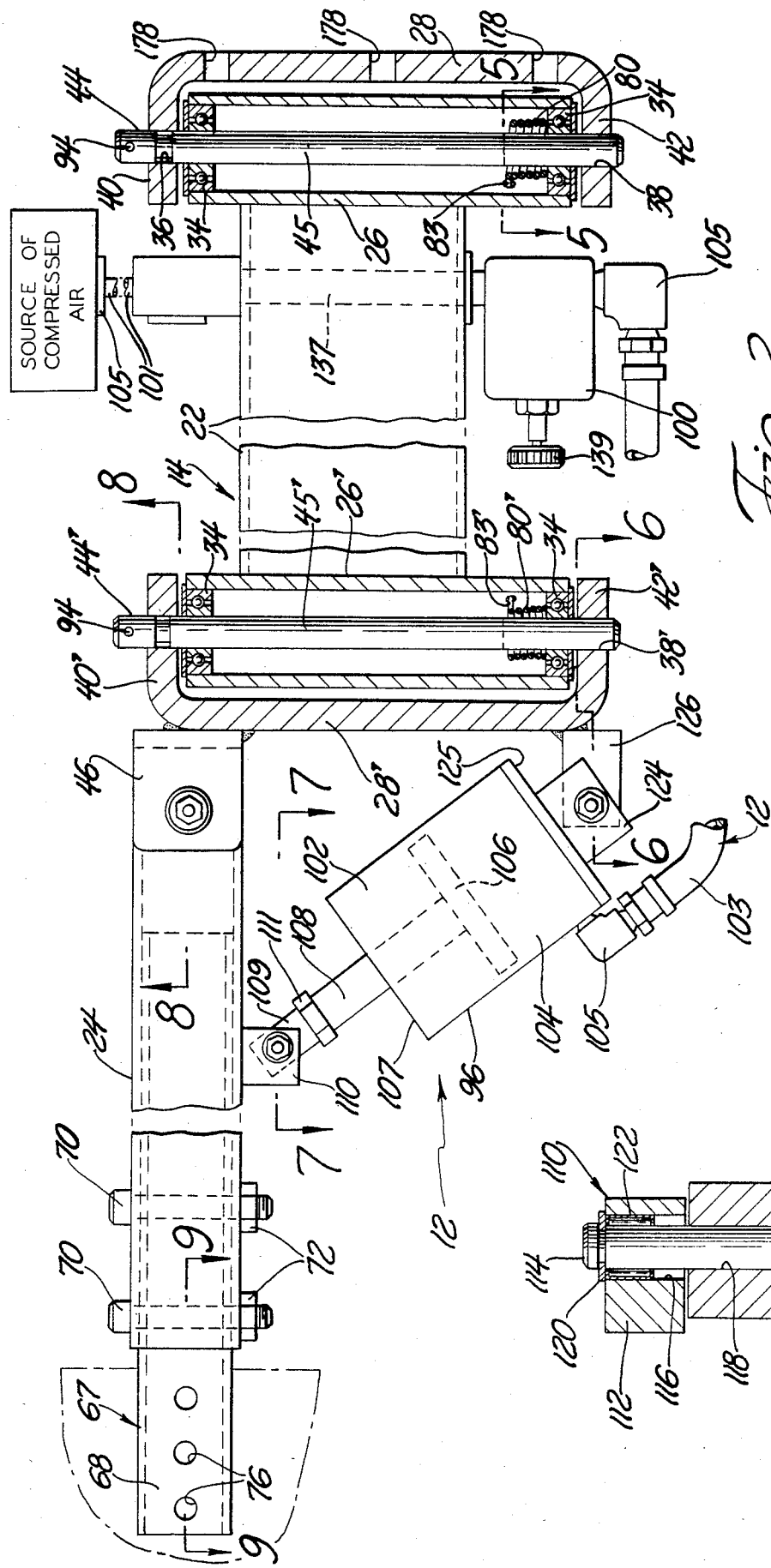
FIG. 2 is an enlarged view of the tool reaction balancing mechanism of FIG. 1, having portions of the mechanism shown in section to illustrate the internal construction thereof.

The articulated arm 14 of the tool reaction balancing mechanism 10 has a first arm section 22 and a second arm section 24, both of which are generally tubular and preferably made of metal. Means are provided at one end of the first arm section 22 adapted to pivotally mount the first arm section 22 to a portion of the travelling bridge 20. As shown, the pivotal mounting means is in the form of an open-ended, preferably metallic housing 26 fixedly secured, by brazing, welding or other appropriate means, to the one end of the first arm section 22, and a preferably metallic clevis or yoke 28 fixedly secured to the travelling bridge 20 by a plurality of nuts 30 and bolts 32, as set forth in greater detail hereafter. Referring now to FIG. 2, a bearing 34 is secured in each end of the housing 26. Aligned bores 36, 38 are provided through top and bottom walls 40,42 of the yoke 28, a rod 44 is journalled through the bearings 34 and passed through the aligned bores 36,38 such that a portion 45 of the rod 44 is axially disposed within the housing 26, and means are provided for retaining the rod 44 through the bearings 34 and bores 36,38, as also explained in detail hereafter.

Means are provided at the other end of the first arm section 22, for pivotally connecting the first arm section 22 to an end of the second arm section 24. As shown, the pivotal connecting means is identical in structure to the pivotal mounting means. An open-ended, preferably metallic housing 26' is fixedly secured, by brazing, welding or other appropriate means, to the other end of the first arm section 22 and a preferably metallic clevis or yoke 28' is fixedly secured proximate its top wall 40' to the end of the second arm section 24 in a similar fashion. A bearing 34 is secured in each end of the housing 26', aligned bores 36',38' are provided through top and bottom walls 40',42' of the yoke 28', a rod 44' is journalled through the bearings 34 and passed through the aligned bores 36',38' such that a portion 45' of the rod 44' is axially disposed within the housing 26, and means are provided for retaining the rod 44' through the bearings 34 and bores 36',38'.

Figure 8:
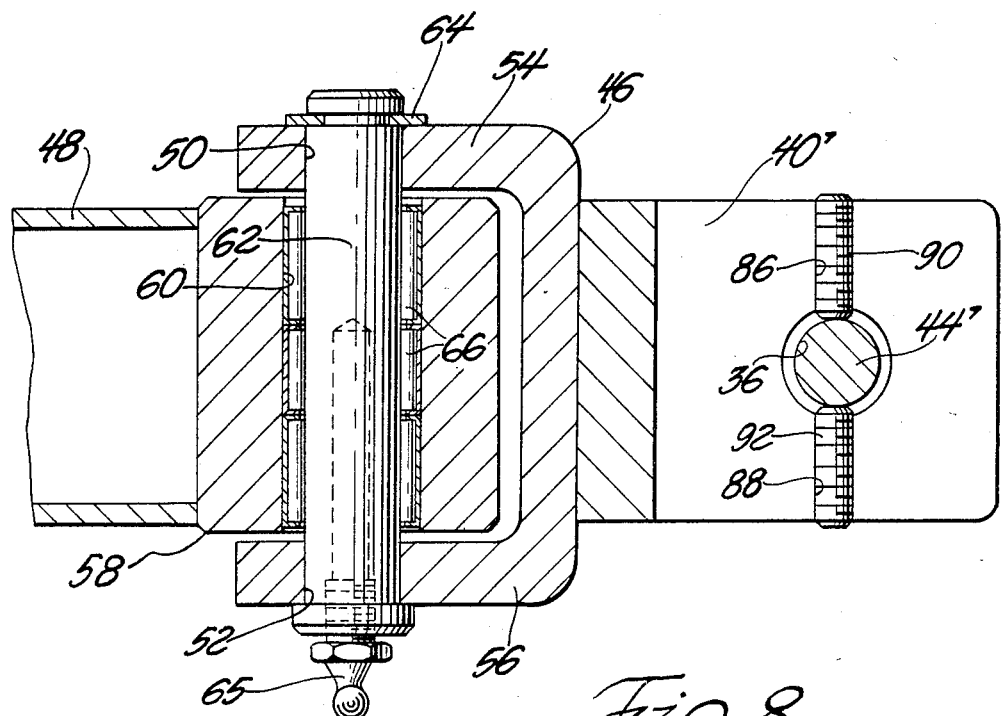

The second arm section 24 has two hinged portions 46,48 hingedly connected as shown at FIG. 8. Hinged portion 46 of the second arm section 24 is in the form of a clevis having aligned bores 50,52 through sidewalls 54 and 56, respectively. The other hinged portion 48 of the second arm section 24 is elongated and generally tubular except for a solid swivelling portion 58 adapted to be fitted within the clevis 46 and having a transverse bore 60 at one end. A stud or bolt 62 is passed through bores 50,52 and 60 and is retained therethrough by a nut 64, for example. A plurality of bearings 66 are concentrically disposed around the exterior periphery of the bolt 62 within the bore 60 and a grease fitting 65 is axially fitted in one end of the bolt 62.

Arm section 24, hinged portion 46, and hinged portion 48 will be seen to constitute a three portion articulated arm assembly with arm section 24 comprising a first arm portion, hinged portion 46 comprising a second arm portion, and hinged portion 48 comprising a third arm portion.

Figure 9:
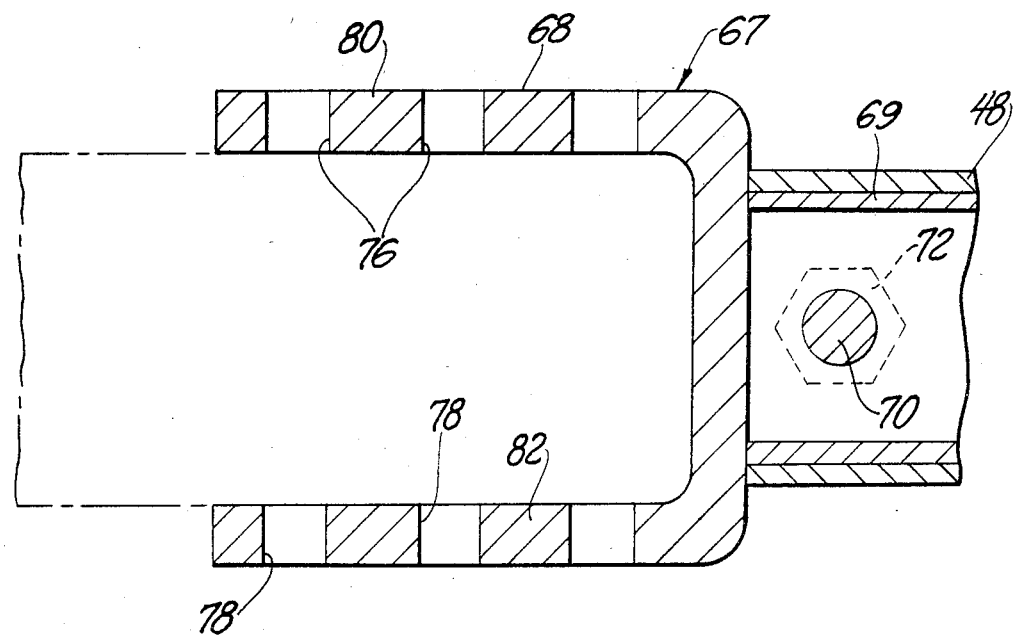

The other end of the generally tubular hinged arm portion 48 of the second arm section 24 is provided with means for holding an object, such as a tool. In the illustrated embodiment, as best shown at FIG. 9, the holding means is in the form of a member 67 having a yoke 68 and an integrally depending, elongated portion 69 protruding at right angle from a wall of the yoke 68. The elongated portion 69 of the member 67 is generally tubular and has dimensions enabling it to be slideably engaged within an end of the hinged portion 48 of the second arm section 24 with a snug fit, FIG. 2. Bolts 70 transversely passed through bores in the elongated portion 69 of the holding means member 67 and through aligned bores in the hinged portion 48 of the arm section 24, and nuts 72 threaded on the end of each bolt 70, retain the elongated portion 69 within the hinged portion 48. It is apparent that, if desired, a plurality of aligned bores can be provided in the hinged portion 48 of the arm section 24 for adjusting the distance by which the yoke 68 of the holding means extends beyond the end of the arm section hinged portion 48.

The yoke 68 of the holding means member 67 is further provided with aligned bores 76,78 in sidewalls 80,82 for mounting directly therebetween, if desired, an object, such as a tool. However, further pivoting or swivelling means can be mounted between bores 76,78, as is well known in the art, with the tool being secured to such pivoting or swivelling means in any appropriate manner.

An additional aspect of an articulated arm according to the invention is biasing means urging the pivotally mounted first arm section 22 to pivot in one direction and the pivotally connected second arm section 24 to pivot in an opposite direction such that the articulated arm 14 tends to fold in on itself as shown in phantom lines at FIG. 10. The biasing means also add an aspect of rigidity to the articulated arm 14 when the arm 14 is extended, to assist a worker in pulling the travelling bridge structure 20, FIG. 10.

Figure 5:
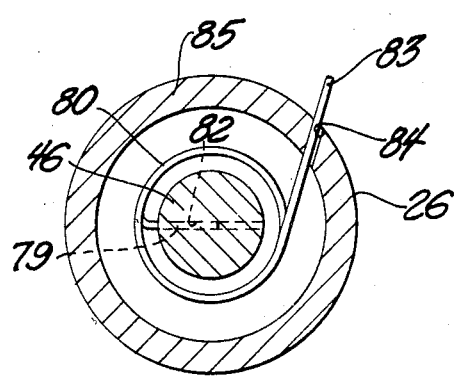

An example of biasing means for the pivotal mounting means of the first arm section 22, and the pivotal connecting means between the first and second arm sections, is shown at FIG. 5. The biasing means is in the form of a torsion spring 80 concentrically disposed around the rod portion 46 axially disposed in the housing 26, with one end 79 of the spring 80 being affixed within a transverse aperture or slot 82 in the rod portion 46 and the other end 83 of the spring 80 being affixed in an angled slot 84 through a wall 85 of the housing. Identical biasing means are provided for the pivotal mounting means of the first arm section 22 and pivotal connecting means between the first and second arm sections 22,24 except that the torsion spring 80' concentrically disposed around the rod portion 46' has a right-hand instead of left-hand winding, or vice versa.

The amount of force applied by the biasing means for the pivotal mounting means, and the amount of force applied by the biasing means for the pivotal connecting means, are each individually adjustable by rotation of the respective rods 44,44'. In other words, rotation of rod 44 winds or unwinds spring 80 and rotation of rod 44' winds or unwinds spring 80'. Referring again to FIG. 8, the previously mentioned means for retaining the rod 44' through the respective bearings 34' and bores 36',38' is also adapted to lock each rod 44' in any desired axial position. Rod 44 has identical retaining means. In particular, a pair of aligned threaded bores 86,88 are provided through the top wall 40' of each yoke 28', each threaded bore 86,88 opening into the bore 36 holding the rod 44'. Each bore 86,88 has an Allen-head bolt 90,92, for example, threaded therein with an end of each bolt 90,92 frictionally engaging the exterior surface of the rod 44'. The end of each Allen-head bolt 90,92 is tightened against the rod 44' after the torsion spring 80' has been wound up to the desired degree. To facilitate rotation of either rod 44 or 44', by a lever, for example, not shown, a transverse hole 94 is preferably provided proximate the top end of each rod 44 or 44', FIG. 2.

Referring now to the conventional pressurized-fluid reaction and balancing system 12, best shown at FIG. 2, a dual-chamber cylinder 96 is fluidly connected to a source of compressed fluid 98, such as air, for example, through an adjustable regulator valve 100 by conduits 101,103 having suitable connections 105 at each end. More particularly, the cylinder 96 is separated into two chambers 102,104 by a reciprocable piston 106, chamber 104 receiving highly pressurized air from source 98 and being at a substantially constant air pressure at all times. The pressure of air in chamber 102 is substantially atmospheric at all times. A piston rod 108 protrudes from one side of the piston 106 and extends through an end wall 107 of the cylinder 96. A member 109 threadably connected to the free end of the piston rod 108 by an integral nut 111 is pivotally connected to the bottom wall of hinged portion 48 of the second arm section 24 by a U-shaped bracket 110. As shown in more detail at FIG. 7, piston rod member 109 is fastened between the sidewalls 112 of the U-shaped bracket 110 by a bolt 114 passed through aligned transverse apertures 116,118 in the sidewalls 112 and rod member 109, and by a nut 120 threaded over the end of the bolt 114. Bearings 122 are concentrically fitted around the exterior periphery of the bolt 114 in the apertures 116 of the bracket sidewalls 112, and a grease fitting 123 is axially secured in the bolt 114.

Figure 6:
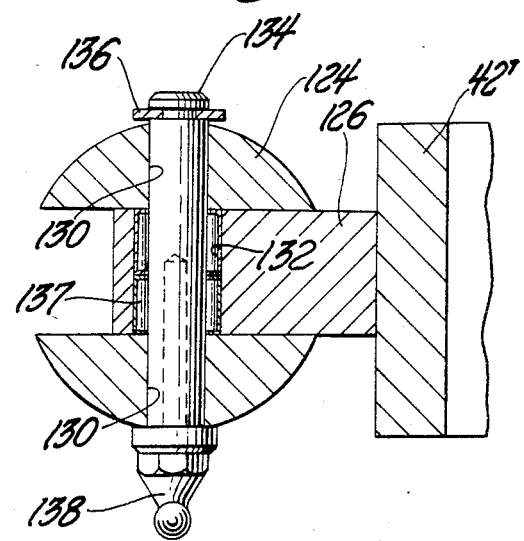

The bottom wall 125 of the cylinder 96 has a projecting mounting portion 124 pivotally connected to a member 126 protruding at right angle from the yoke 28' proximate the bottom wall 42 thereof, as shown in detail at FIG. 6. The mounting portion 124 of the cylinder 96 is solidly cylindrical as shown, except for a diametric slot 128. The member 126 protruding from the yoke bottom wall 40' is solid and rectangular in cross-section, having dimensions enabling it to be inserted in the cylinder mounting portion slot 128 with a snug fit. Aligned bores 130,132 are provided in the cylinder mounting portion 124 and the yoke protruding member 126. A bolt 134 is passed through the bores 130, 132 and a nut 136 is threaded over an end thereof. Bearings 137 are concentrically disposed around the bolt 134 in bore 130 and a grease fitting 138 is axially fitted in the bolt 134.

In use, the fluid-pressure, reaction and balancing system 12 operates in a conventional manner to "balance" the hinged portion of arm section 24 by normally maintaining same in the "weightless" intermediary position shown at FIGS. 1 and 2. The system further provides lift to the hinged portion 48 of the second arm section 24, and controllably permits the lowering of the hinged portion 48, as desired. For example, if the hinged portion 48 of the second arm section 24 is urged upwardly by a worker wishing to lift a tool mounted at the end of the second arm section 24, the piston rod 108 is pulled upwardly by its pivotal end connection with the bracket 110, the piston 106 is slideably displaced toward the top wall 107 of the cylinder 96 and the volume of pressurized air chamber 104 increases. The pressure regulator valve 100 senses the movement of the piston 106, in a manner well known in the art, and provides additional pressurized air to the chamber 104, thereby helping to lift the hinged portion 48 of the second arm section 24 by the piston rod 108. Conversely, if the hinged portion 48 is controllably urged downwardly by a worker, the piston rod 108 is pushed downwardly, the piston 106 is displaced toward the cylinder bottom wall 125 and the volume of pressurized air chamber 104 progressively decreases. The pressure regulator valve 100 again senses the controlled movement of the piston 106 and progressively releases pressurized air from the chamber 104, thereby helping to controllably lower the hinged portion 48 of the second arm section.

However, if the hinged portion 48 is suddenly and uncontrollably jerked or tugged toward the cylinder 98, such that piston 106 attempts to move rapidly toward the cylinder bottom wall 125, the air in chamber 104 compressing at a faster rate than it is released, thereby absorbing the shock. After the system 12 "reacts" in this fashion, it immediately rebalances the hinged arm portion 48 by valve 100 providing air to chamber 104 to reestablish the substantially constant pressure therein.

As is also well known in the art, the pressure regulator valve 100 is preferably provided with a balance adjusting knob 139 which permits a worker to adjust the initial amount of air pressure transmitted to the air chamber 104 as a function of the weight of an object mounted at the end of the second arm section 24. For convenience of use, the regulator valve 100 may be directly mounted to the first arm section 22 and connected to the conduit 101 by a tubing 137 passed through the first arm section 22.

Figure 3:
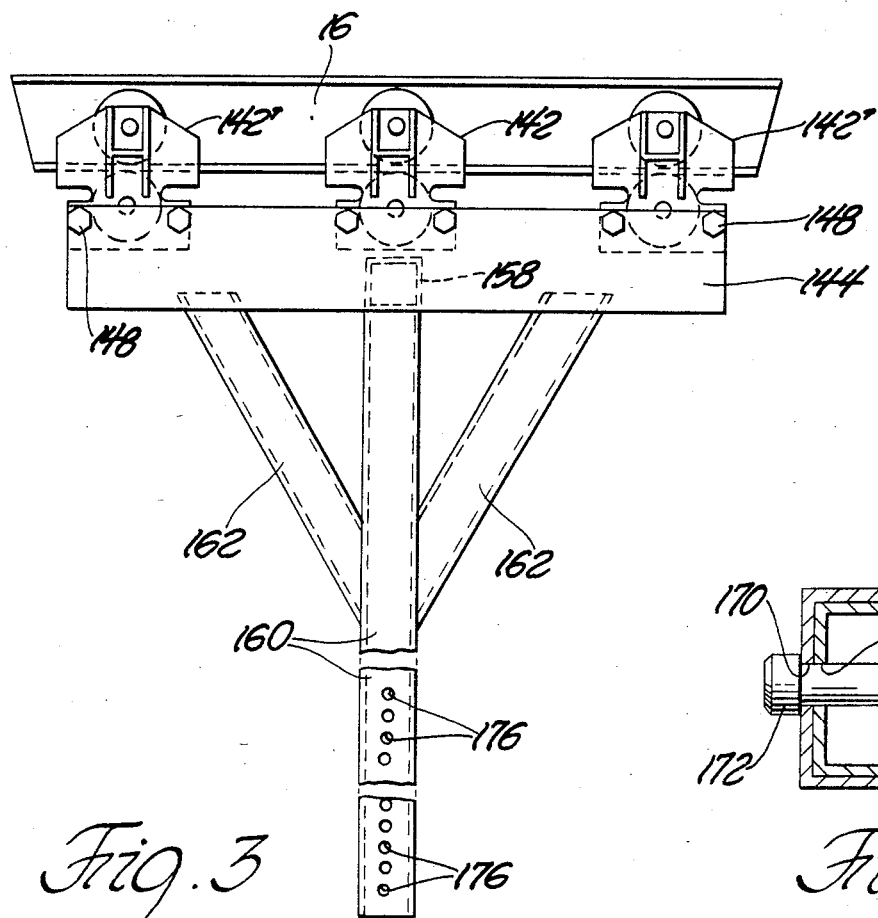
FIG. 3 is a front elevation view of the travelling bridge, as seen from line 3—3 of FIG. 1.
Figure 4:
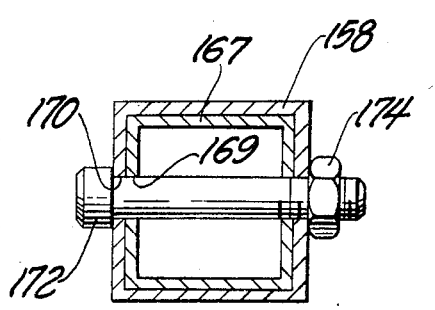

Referring now to the travelling bridge structure 20 illustrated at FIGS. 1, 3 and 4, the bridge 20 has a two piece construction consisting of a main frame unit 140 and a slideable frame unit 143 telescopically connected to the main frame unit 140 by a telescopic cross beam 141. Two spaced-apart conventional, four-roller trolley members 142, engageable with and moveable along rail 16, are mounted to the top of the main frame unit 140 between a set of panels 144,146 by bolts 148 which extend between the panels, through aligned bores provided proximate the top of the panels 144,146 and through a transverse bore 150 in the bottom of each trolley member 142. The bolts 148 are locked in position by nuts 152. A single, conventional, four-roller trolley member 142', engageable with and moveable along rail 18, is mounted to the top of the slideable frame unit 143, between a set of panels 154,156, in the same manner as the trolley members 142 mounted to the top of the main frame unit 140.

One of the panels 146 of the main frame unit 140 has a cut-out portion and one end of an elongated tubular sleeve 158, forming a portion of the telescopic cross beam 141, is mounted in the cut-out portion at right angle to the panels, 144,146. Another elongated tubular member, in the form of a depending load support beam 160, is affixed between the bottom of the panels 144,146 and protrudes downwardly therefrom. Two reinforcing beams or gussets 162 are angularly affixed between the support beam 160 and a free, open end 164 of the tubular sleeve 158.

One of the panels 154 of the slideable frame unit 143 also has a cut-out portion with one end 166 of an elongated tubular sleeve 167, forming another portion of the telescopic cross beam 141, mounted therein at right angle to the panels 154,156.

Both frame units 140,142, are preferably formed of metal, with the panels 144,146, tubular sleeve 158, load support beam 160 and gussets 162 of the main frame unit 140 brazed or welded together, and with the plates of the slideable frame unit 143 brazed or welded to the tubular sleeve 167.

The telescopic cross beam 141 telescopically connecting the main frame unit 140 and slideable frame unit 143 is shown in detail at FIGS. 1 and 4. The tubular sleeve 167 of the slideable frame unit 142 is dimensioned to enable it to be inserted into the open end 164 of the tubular sleeve 158 of the main frame unit 140 with a finger tight fit therebetween. The slideable frame unit tubular sleeve 167 is further provided with a pair of spaced-apart, elongated transverse slots 169 having midpoints the same distance apart as the midpoints of two sets of aligned bores 170 through the main frame unit tubular sleeve 158. A bolt 172, or similar member, is passed through each set of aligned bores 170 in the main frame unit tubular sleeve 158 and through a corresponding slot 169 in slideable frame unit tubular sleeve 167. Nuts 174 are loosely threaded over the end of each bolt 172.

At FIG. 3 it can be seen that the trolley members 142 engageable with and moveable along rail 16 are spaced a substantially equal distance apart from the trolley member 142' engageable with and moveable along rail 18 so that the travelling bridge has a secure, three point connection with the rails. Although conventional, four-roller trolley members 142,142' are shown in the drawing, it will be understood that any trolley means engageable with, and moveable along a rail or track may be substituted.

At FIGS. 1 and 3 it can also be seen that the bottom of the main frame unit depending load support beam 160 has a plurality of mounting holes 176. These mounting holes are uniformly spaced-apart a distance corresponding to the distance between bores 178 in the rear wall of articulated arm yoke 26. As previously mentioned, the yoke 26 may be mounted to the support beam by nuts 30 and bolts 32, at any desired height and although the mounting holes 176 are shown extending upwardly only to the midpoint of the load support beam 160, they can be provided across its entire length, if desired.

FIG. 10 illustrates the advantages of the novel tool reaction balancing mechanism and travelling bridge assembly by depicting the several movements which the assembly makes possible. In the first instance, the travelling bridge 20, having two trolley members 142, engageable with and moveable along on rail 16 and a single troley member engageable with and moveable along on rail 18, permits the entire assembly to travel in either direction shown by the arrows without becoming stuck, due to the telescopic cross beam 141 telescopically connecting the frame units. The articulated arm 14 is normally in the position shown in dotted-line by urging of the biasing means. The free end of the articulated arm, having means for holding a tool, may be pulled outwardly horizontally to the point A, for example, due to the pivotal mounting of the first arm section 22 and the pivotal connection of the second arm section 24. The free end of the articulated arm may then be displaced along a linear path to point B, without any movement of the travelling bridge 20. As the free end of the articulated arm is displaced to point B, the pivotal connecting means moves back toward its rest position, as shown at "X" and the second arm section pivots horizontally to the right. Between points B and C, the pivotal connecting means moves arcuately away from its rest position to point Y. Point D is the point of maximum horizontal linear displacement of the free end of the articulated arm which can be accomplished without moving the travelling bridge.

It will be understood that in addition to the linear movements of the free end of the articulated arm heretofore described, the articulated arm free end can be swung across an arcuate path between points "A" and "D" and can also be raised or lowered vertically to the plane of the drawing along the hinged connection of the first and second arm sections with an assist from the fluid-pressure system, not shown at FIG. 10.

The embodiment shown in the drawings is merely an example of structure, and the scope of the invention is defined by the appended claims.

The embodiments of the invention in which an exclusive property or privilege is claimed are defined as follows:

1. A tool reaction balancing mechanism comprising an articulated arm including a first arm portion, means at one end of said first arm portion mounting one end of said first arm portion to a support assembly for pivotal movement about a first generally vertical axis, a second arm portion, means at the other end of said first arm portion mounting one end of said second arm portion to the other end of said first arm portion for pivotal movement about a second generally vertical axis, a third arm portion mounted at one end thereof to the other end of said second arm portion for pivotal movement about a third generally horizontal axis, tool holding means at the other end of said third arm portion, and power balancing means allowing free upward and downward pivotal movement of said third arm portion about said third axis by an operator to selectively move a tool held in said tool holding means and operative in response to such upward and downward pivotal movement of said third arm portion about said third axis to provide a power assist to such upward movement and a controlled balancing of such downward movement.

2. The invention as defined in claim 1 further comprising biasing means urging said other end of said first arm portion toward said support assembly.

3. The invention as defined in claim 1 further comprising biasing means urging said other end of said second arm portion toward said first arm section.

4. The invention as defined in claim 2 wherein the amount of force applied by said biasing means is adjustable.

5. The invention as defined in claim 3 wherein the amount of force applied by said biasing means is adjustable.

6. The invention as defined in claim 1 wherein said second arm portion comprises a bracket pivotally interposed between said other end of said first arm portion and said one end of said third arm portion, and said power balancing means comprises a force balance piston and cylinder assembly operatively connected between said bracket and said third arm portion and means for maintaining the pressure in the power end of said cylinder of said piston and cylinder assembly substantially constant irrespective of variations in the effective length of said piston and cylinder assembly occurring in response to movement of said third arm portion about said third, horizontal axis.

7. The invention as defined in claim 6 wherein said pressure maintaining means includes a pressure regulator mounted on said first arm portion.

8. A tool reaction balancing mechanism according to claim 1 wherein said third arm portion is tubular and said tool holding means comprises an arm telescopically received in the open other end of said third arm portion.

9. An apparatus according to claim 7 wherein said support assembly comprises an overhead trolley assembly adapted to move rollably along rail means, a support structure depending downwardly from said trolley assembly, and means adjacent the lower end of said support structure defining said first generally vertical axis for pivotal receipt of said one end of said first arm portion.

10. A tool reaction balancing mechanism, comprising an articulated arm including a first arm section, means at one end of said first arm section adapted to pivotally mount said first arm section to a support member, a second arm section, means at the other end of said first arm section pivotally connecting said first arm section to an end of said second arm section, and tool holding means at the other end of said second arm section wherein said articulated arm permits a tool held in said tool holding means to be displaced along a linear path, said means adapted to pivotally mount said first arm section to said support member comprising an open ended housing fixedly secured to said one arm of said arm section, a bearing secured at each end of said housing, a yoke adapted to be fixedly secured to said support member, aligned bores through top and bottom walls of said yoke, a rod journaled through said bearings and passed through said apertures such that a portion of said rod is axially disposed within said housing, and means for retaining said rod through said bearings and said apertures.

11. The invention as defined in claim 10 wherein said rod has a transverse slot, a wall of said housing has a transverse slot, and a torsion spring is concentrically disposed around said portion of said rod within said housing, one end of said spring being fixed within said slot in said rod and the other end of said spring being fixed within said slot in said housing.

12. A travelling bridge for suspending a load from a first rail and a spaced-apart second rail, said bridge comprising at least one trolley means engageable with and moveable along said first rail, at least one trolley means engageable with and moveable along said second rail, a telescopic cross beam operatively connecting said trolley means, and a load support beam operatively connected to and depending from said cross beam, wherein said telescopic cross beam permits said trolley means to move relative to each other to compensate for variances in the distance separating said rails along their respective lengths.

13. The invention as defined in claim 12 wherein said telescopic cross beam comprises a first elongated tubular sleeve having an open end, and a second elongated tubular sleeve having a portion slideably disposed in said first tubular sleeve and a portion protruding from said open end thereof.

14. The invention as defined in claim 13 wherein said telescopic cross beam further comprises means for retaining said slideably disposed portion of said second tubular sleeve within said first tubular sleeve.

15. The invention as defined in claim 14 wherein said means for retaining said slideably disposed portion of said second tubular sleeve within said first tubular sleeve comprises at least one transverse bore through the periphery of said first tubular sleeve, at least one transverse slot in said slideably disposed portion of said second tubular sleeve, and a rigid member configured to be fittable through one of said bores and one of said slots.

16. The invention as defined in claim 12 wherein two trolley means are engageable with and moveable along said first rail and only one trolley means is engageable with and moveable along said second rail.

17. The invention as defined in claim 16 wherein each of said two trolley means engageable with and moveable along said first rail is spaced-apart a substantially equal distance from said one trolley means engageable with and moveable along said second rail.

18. The invention as defined in claim 12 further comprising a plurality of reinforcing beams fixedly secured between said cross beam and said depending load support beam.

19. The invention as defined in claim 12 wherein each of said trolley means is fastened between two plates fixedly connected to a portion of said cross beams.

20. A tool reaction balancing mechanism comprising an articulated arm suspended from a first rail and a spaced-apart second rail by a travelling bridge, said articulated arm having means at one end thereof adapted to pivotally mount said arm to a portion of said bridge and tool holding means at the other end thereof for holding a tool, said arm being operable and configured to permit a tool held in said tool holding means to be displaced along a linear path, and wherein said travelling bridge comprises at least one trolley means engageable with and moveable along said first rail, at east one trolley means engageable with and moveable along said second rail, and a telescopic cross beam operatively connecting said trolley means wherein said telescopic cross beam permits said trolley means to move relative to each other to compensate for variances in the distance separating said rails along their respective lengths.

21. The invention as defined in claim 20 wherein said articulated arm comprises a first arm section pivotally connected to a second arm section.

22. The invention as defined in claim 21 further comprising biasing means urging said first arm section toward said portion of said travelling bridge.

23. The invention as defined in claim 21 further comprising biasing means urging said second arm section toward with said first arm section.

24. The invention as defined in claim 22 wherein the amount of force applied by said biasing means is adjustable.

25. The invention as defined in claim 23 wherein the amount of force applied by said biasing means is adjustable.

26. The invention as defined in claim 21 wherein said means adapted to mount said articulated arm to a portion of said bridge comprises an open-ended housing fixedly secured to one end of said first arm section, a bearing secured in each end of said housing, a yoke adapted to be fixedly secured to said bridge structure portion, aligned bores through top and bottom walls of said yoke, a rod journalled through said bearings and passed through said apertures such that a portion of said rod is axially disposed within said housing, and means for retaining said rod through said bearings and said apertures.

27. The invention as defined in claim 21 wherein said means for pivotally connecting said first arm section to said second arm section comprises an open-ended housing fixedly secured to an end of said first arm section, a bearing secured in each end of said housing, a yoke fixedly secured to an end of said second arm section, aligned bores in top and bottom walls of said yoke, a rod journalled through said bearings and passed through said apertures such that a portion of said rod is axially disposed within said housing, and means for retaining said rod through said bearings and said apertures.

28. The invention as defined in claim 26 wherein said rod has a transverse slot, a wall of said housing has a transverse slot, and a torsion spring is concentrically disposed around said portion of said rod within said housing, one end of said spring being affixed within said slot in said rod and the other end of said spring being affixed within said slot in said housing.

29. The invention as defined in claim 27 wherein said rod has a transverse slot, a wall of said housing has a transverse slot, and a torsion spring is concentrically disposed around said portion of said rod within said housing, one end of said spring being affixed within said slot in said rod and the other end of said spring being affixed within said slot in said housing.

30. The invention as defined in claim 21 further comprising a fluid-pressure reaction and balancing system operatively connected to said second arm section.

31. The invention as defined in claim 30 wherein said reaction and balancing system includes a cylinder fluidly connected to a source of fluid under pressure through regulator means, said regulator means being mounted on said articulated arm.

32. The invention as defined in claim 20 wherein said telescopic cross beam comprises a first elongated tubular sleeve having an open end, and a second elongated tubular sleeve having a portion slideably disposed in said first tubular sleeve and a portion protruding from said open end thereof.

33. The invention as defined in claim 32 wherein said telescopic cross beam further comprises means for retaining said slideably disposed portion of said second tubular sleeve within said first tubular sleeve.

34. The invention as defined in claim 33 wherein said means for retaining said slideably disposed portion of said second tubular sleeve within said first tubular sleeve comprises at least one transverse bore through the periphery of said first tubular sleeve, at least one transverse slot in said slideably disposed portion of said second tubular sleeve, and a rigid member configured to be fittable through one of said bores and one of said slots.

35. The invention as defined in claim 20 wherein two trolley means are are engageable with and moveable along said first rail and only one trolley means is engageable with and moveable along said second rail.

36. The invention as defined in claim 35 wherein each of said two trolley means engageable with and moveable along said first rail is spaced-apart a substantially equal distance from said one trolley means engageable with and moveable along said second rail.

37. The invention as defined in claim 20 further comprising a plurality of reinforcing beams fixedly secured between said cross beam and said depending load support beam.

38. The invention as defined in claim 20 wherein each of said trolley means is fastened between two plates fixedly connected to a portion of said cross beam.

39. A tool reaction balancing mechanism, comprising an articulated arm including a first section, means at one end of said first arm section adapted to pivotally mount said first arm section to a support member, a second arm section, means at the other end of said first arm section pivotally connecting said first arm section to an end of said second arm section, and tool holding means at the other end of said second arm section wherein said articulated arm permits a tool held in said tool holding means to be displaced along a linear path, said means pivotally connecting said first arm section to said one end of said second arm section comprising an open ended housing fixedly secured to said other end of said first arm section, a bearing secured at each end of said housing, a yoke fixedly secured to said end of said second arm section, aligned bores in top and bottom walls of said yoke, a rod journaled through said bearings and passed through said apertures such that a portion of said rod is axially disposed within said housing, and means for retaining said rod through said bearings and said apertures.

40. The invention as defined in of claim 39 wherein said rod has a transverse slot, a wall of said housing has a transverse slot, and a torsion spring is concentrically disposed around said portion of said rod within said housing, one end of said spring being fixed within said slot in said rod and the other end of said spring being fixed within said slot in said housing.

41. A tool reaction balancing mechanism comprising
A. a vertically disposed support assembly;
B. a first arm member pivotally mounted at one end thereof on said support assembly for pivotal movement about a first generally vertical axis;
C. a bracket mounted on the other end of said first arm member for pivotal movement about a second generally vertical axis;
D. a second arm member pivotally mounted at one end thereof to said bracket for pivotal movement about a third generally horizontal axis;
E. tool holding means carried at the free end of said second arm member;
F. a piston and cylinder assembly operatively connected between said bracket and said second arm member; and
G. regulator means for maintaining the pressure in the power end of said piston and cylinder assembly substantially constant irrespective of variations in the effective length of said piston and cylinder assembly occurring in response to movement of said second arm about said third horizontal axis.

* * * * *